US007301618B2

(12) United States Patent
Cok et al.

(10) Patent No.: US 7,301,618 B2
(45) Date of Patent: Nov. 27, 2007

(54) METHOD AND APPARATUS FOR UNIFORMITY AND BRIGHTNESS CORRECTION IN AN OLED DISPLAY

(75) Inventors: Ronald S. Cok, Rochester, NY (US); James H. Ford, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 134 days.

(21) Appl. No.: 11/093,115

(22) Filed: Mar. 29, 2005

(65) Prior Publication Data

US 2006/0221326 A1 Oct. 5, 2006

(51) Int. Cl.
*G01J 1/42* (2006.01)
*G09G 3/10* (2006.01)

(52) U.S. Cl. .................... 356/218; 315/169.3; 345/77; 345/82

(58) Field of Classification Search ................ 356/213, 356/218; 315/169.3, 169.2; 345/77, 214
See application file for complete search history.

(56) References Cited

U.S. PATENT DOCUMENTS

| | | | | |
|---|---|---|---|---|
| 6,081,073 | A | 6/2000 | Salam | |
| 6,414,661 | B1 | 7/2002 | Shen et al. | |
| 6,473,065 | B1 | 10/2002 | Fan | |
| 6,989,636 | B2* | 1/2006 | Cok et al. | 315/169.3 |
| 7,092,081 | B2* | 8/2006 | Wang et al. | 356/218 |
| 2002/0105279 | A1 | 8/2002 | Kimura | |
| 2004/0257352 | A1 | 12/2004 | Naugler, Jr. et al | |
| 2005/0280615 | A1* | 12/2005 | Cok et al. | 345/77 |
| 2006/0061248 | A1* | 3/2006 | Cok et al. | 313/110 |
| 2006/0063281 | A1* | 3/2006 | Cok et al. | 438/14 |
| 2006/0077136 | A1* | 4/2006 | Cok | 345/76 |
| 2006/0114451 | A1* | 6/2006 | Wang et al. | 356/218 |
| 2006/0132400 | A1* | 6/2006 | Cok et al. | 345/81 |

OTHER PUBLICATIONS

U.S. Appl. No. 10/858,260; filed Jun. 1, 2004, Ronald S. Cok et al; "Uniformity And Brightness Measurement In OLED Displays".

(Continued)

*Primary Examiner*—Hoa Q. Pham
(74) *Attorney, Agent, or Firm*—Andrew J. Anderson; Stephen H. Shaw

(57) ABSTRACT

A method for the correction of average brightness or brightness uniformity variations in OLED displays comprising: a) providing an OLED display having one or more light-emitting elements responsive to a multi-valued input signal for causing the light-emitting elements to emit light at a plurality of brightness levels; b) measuring the brightness of each light-emitting element at two or more, but fewer than all possible, different input signal values; c) employing the measured brightness values to estimate a maximum input signal value at which the light-emitting element will not emit more than a predefined minimum brightness and the rate at which the brightness of the light-emitting element increases above the predefined minimum brightness in response to increases in the value of the input signal; and d) using the estimated maximum input signal value at which the light-emitting element will not emit light more than the predefined minimum brightness and the rate at which the brightness of the light-emitting element increases above the predefined minimum brightness in response to increases in the value of the input signal to modify the input signal to a corrected input signal to correct the light output of the light-emitting elements.

25 Claims, 7 Drawing Sheets

OTHER PUBLICATIONS

U.S. Appl. No. 10/8869,009; filed Jun. 16, 2004, Ronald S. Cok et al; "Method And Apparatus For Uniformity And Brightness Correction In An OLED Displays".

U.S. Appl. No. 10/894,729; filed Jul. 20, 2004, Ronald S. Cok et al; "Method And Apparatus For Uniformity And Brightness Correction In An OLED".

* cited by examiner

METHOD AND APPARATUS FOR UNIFORMITY AND BRIGHTNESS CORRECTION IN AN OLED DISPLAY

FIELD OF THE INVENTION

The present invention relates to OLED displays having a plurality of light-emitting elements and, more particularly, to correcting brightness of the light-emitting elements in the display.

BACKGROUND OF THE INVENTION

Organic Light Emitting Diodes (OLEDs) have been known for some years and have been recently used in commercial display devices. Such devices employ both active-matrix and passive-matrix control schemes and can employ a plurality of light-emitting elements. The light-emitting elements are typically arranged in two-dimensional arrays with a row and a column address for each light-emitting element and having a data value associated with each light-emitting element to emit light at a brightness corresponding to the associated data value. However, such displays suffer from a variety of defects that limit the quality of the displays. In particular, OLED displays suffer from non-uniformities in the light-emitting elements. These non-uniformities can be attributed to both the light emitting materials in the display and, for active-matrix displays, to variability in the thin-film transistors used to drive the light emitting elements.

It is known in the prior art to measure the performance of each pixel in a display and then to correct for the performance of the pixel to provide a more uniform output across the display. U.S. Pat. No. 6,081,073 entitled "Matrix Display with Matched Solid-State Pixels" by Salam granted Jun. 27, 2000 describes a display matrix with a process and control means for reducing brightness variations in the pixels. This patent describes the use of a linear scaling method for each pixel based on a ratio between the brightness of the weakest pixel in the display and the brightness of each pixel. However, this approach will lead to an overall reduction in the dynamic range and brightness of the display and a reduction and variation in the bit depth at which the pixels can be operated.

U.S. Pat. No. 6,473,065 B1 entitled "Methods of improving display uniformity of organic light emitting displays by calibrating individual pixel" by Fan issued Oct. 29, 2002 describes methods of improving the display uniformity of an OLED. In order to improve the display uniformity of an OLED, the display characteristics of all organic-light-emitting-elements are measured, and calibration parameters for each organic-light-emitting-element are obtained from the measured display characteristics of the corresponding organic-light-emitting-element. The calibration parameters of each organic-light-emitting-element are stored in a calibration memory. The technique uses a combination of look-up tables and calculation circuitry to implement uniformity correction. However, the described approaches require either a lookup table providing a complete characterization for each pixel, or extensive computational circuitry within a device controller. This is likely to be expensive and impractical in most applications.

There is a need, therefore, for an improved method of providing uniformity in an OLED display that overcomes these objections.

SUMMARY OF THE INVENTION

In accordance with one embodiment, the invention is directed towards a method for the correction of average brightness or brightness uniformity variations in OLED displays comprising:

a) providing an OLED display having one or more light-emitting elements responsive to a multi-valued input signal for causing the light-emitting elements to emit light at a plurality of brightness levels;

b) measuring the brightness of each light-emitting element at two or more, but fewer than all possible, different input signal values;

c) employing the measured brightness values to estimate a maximum input signal value at which the light-emitting element will not emit more than a predefined minimum brightness and the rate at which the brightness of the light-emitting element increases above the predefined minimum brightness in response to increases in the value of the input signal; and d) using the estimated maximum input signal value at which the light-emitting element will not emit light more than the predefined minimum brightness and the rate at which the brightness of the light-emitting element increases above the predefined minimum brightness in response to increases in the value of the input signal to modify the input signal to a corrected input signal to correct the light output of the light-emitting elements.

ADVANTAGES

In accordance with various embodiments, the present invention may provide the advantage of improved uniformity in a display that reduces the complexity of calculations, minimizes the amount of data that must be stored, improves the yields of the manufacturing process, and reduces the electronic circuitry needed to implement the uniformity calculations and transformations.

DETAILED DESCRIPTION OF THE INVENTION

Figure 1:
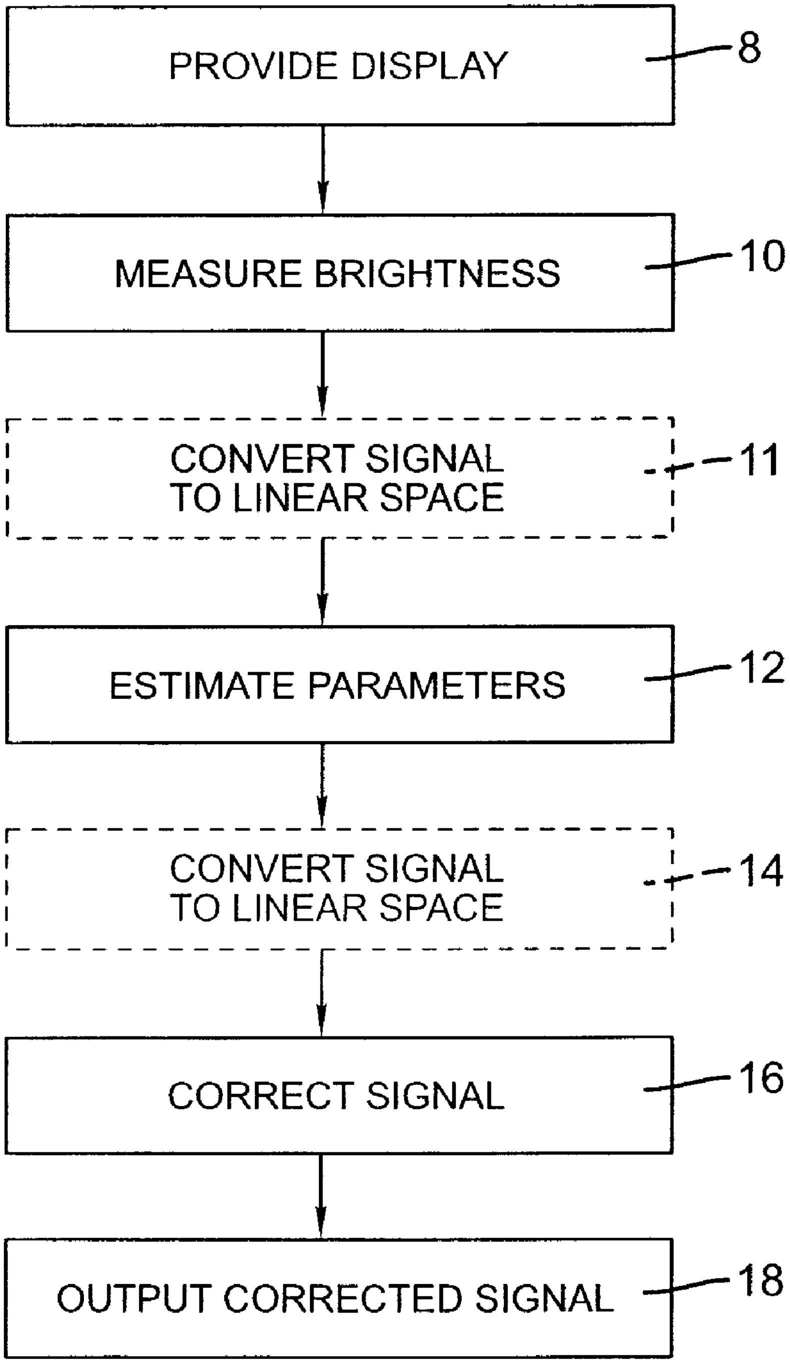
FIG. 1 is a flow diagram illustrating the method of the present invention.

Referring to FIG. 1, the present invention is directed to a method and apparatus for the correction of brightness and uniformity variations in OLED displays, comprising providing 8 an OLED display having one or more light-emitting elements responsive to a multi-valued input signal for causing the light-emitting elements to emit light at a plurality of brightness levels; measuring 10 the brightness of each light-emitting element at two or more, but fewer than all possible, different input signal values; employing the measured brightness values to estimate 12 a maximum input signal value at which the light-emitting element will not emit more than a predefined minimum brightness (the offset) and the rate at which the brightness of the light-emitting element increases above the predefined minimum brightness in response to increases in the value of the input signal (the gain); and using the estimated maximum input signal value at which the light-emitting element will not emit light more than the predefined minimum brightness and the rate at which the brightness of the light-emitting element increases above the predefined minimum brightness in response to increases in the value of the input signal to modify the input signal to a corrected input signal to correct 16 the light output of the light-emitting elements. Finally, a corrected input signal for each pixel may be output 18 to a display for viewing by an observer. In a preferred embodiment, the input signal may be converted 14 into a linear space before correcting 16 if the input signal is not in an appropriate linear space for correction and output to a display. In a further preferred embodiment, the measured brightness values may also be converted 11 into the same linear space. Such conversions may be common to all light emitting elements, or to all light emitting elements of a particular color.

Figure 3:
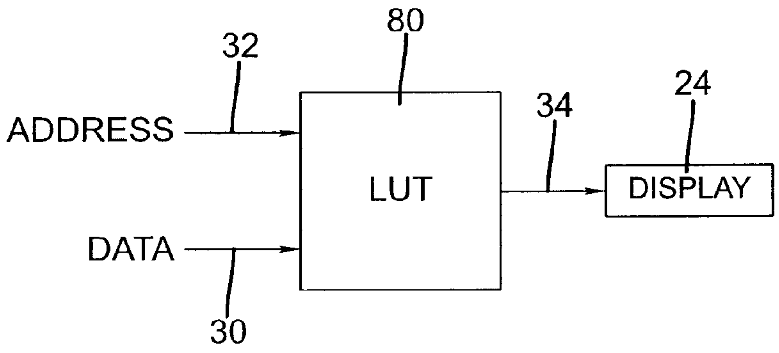
FIG. 3 PRIOR ART
FIG. 3 is a schematic diagram illustrating an embodiment of the prior art.

Referring to FIG. 3, a prior-art system is described. In FIG. 3, a correction lookup table 80 provides an output signal value 34 for each input signal data value 30 for each location (address signal 32) of a light-emitting element (pixel) in a display 24. The correction values in the correction table 80 may be obtained by a variety of means known in the prior art, for example using a camera to obtain the output brightness of each pixel for each data signal input. The correction table 80 then provides a corrected output value 34 to cause the pixel to output at the desired brightness for each input value. If a display 24 is completely uniform and at the desired brightness for each input signal 30, then the correction table output matches the input for each pixel. If a display 24 is not completely uniform or at the desired brightness for each input signal, then the correction table 80 supplies the corrected output signal 34 that will drive the desired display output.

In the most complete case, this approach requires a lookup table value for each pixel at each input signal value. For example, if a display incorporates a 1,000 by 1,000 array of pixels at a signal bit depth of 8 bits, a 256 MByte memory is required. If each pixel in the display is a color pixel, then additional memory must be employed for each color, resulting in a requirement of 768 MBytes. Even for relatively small displays, e.g. 100 by 100 pixels, this requirement is a significant 7.68 MBytes. Hence, such a design may be impractical for cost or packaging reasons. While alternative solutions requiring less memory (e.g., use of linear interpolations between fewer data points) may be employed, such approaches may be less accurate, particularly for device responses that are non-linear and may require extensive computational hardware.

Figure 2:
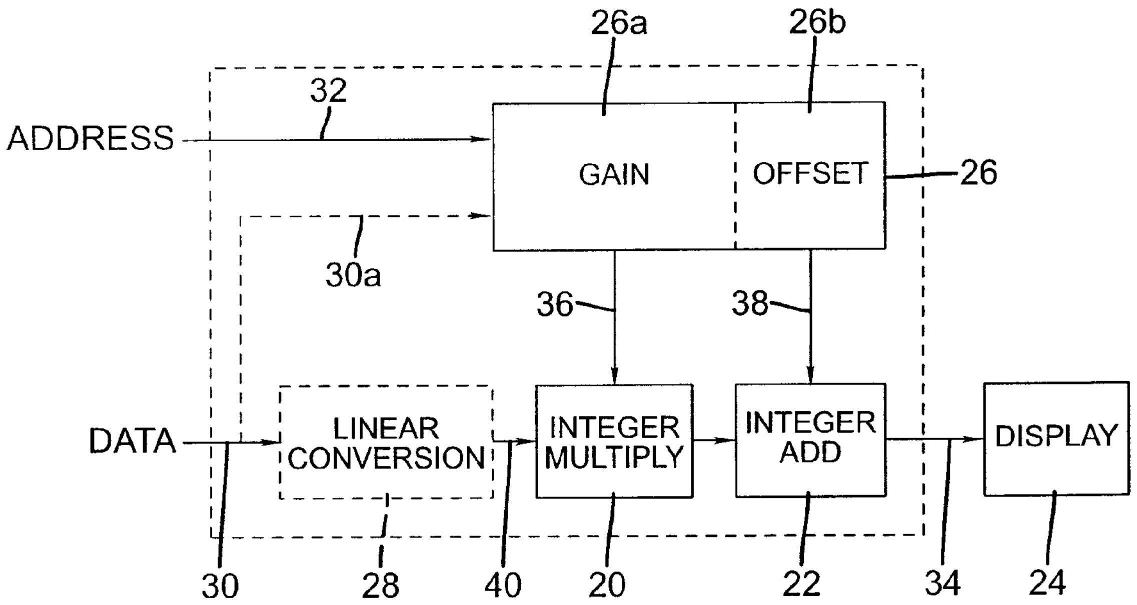
FIG. 2 is a schematic diagram illustrating an embodiment of the present invention.

Referring to FIG. 2, one embodiment of a simpler solution according to the present invention requiring far less memory is illustrated. An input data signal 30 is input with an address value signal 32 providing correction data for each pixel in the display 24. The input signal may be analog or digital, although a digital signal is preferred. If a conversion of the input signal to a linear space is desired to improve accuracy of a correction, it may be performed through a look-up table 28 to form a linear input data signal 40. This conversion may be a common conversion that is applied to all input signals, and may be based upon a series of measured brightness values and a priori knowledge of the display response to input signals.

The address value 32 (representing the location of a light emitting element in the display 24) is applied to a look-up table 26 having a single entry for each light emitting element location. Preferably, a single, multi-bit integrated circuit memory is employed to reduce size and to minimize cost. Because storage is limited due to cost and size restrictions, the multi-bit storage is divided into first and second portions 26*a* and 26*b* and employed to store the two values associated with each light emitting element location: the offset 38 representing the maximum input signal value at which the light-emitting element will not emit more than a predefined minimum brightness, and the gain 36 representing the rate at which the brightness of the light-emitting element increases above the predefined minimum brightness in response to increases in the value of the input signal. The two values 36 and 38 may be stored with unequal precision; preferably the offset value 38 has fewer bits than the gain value 36. The offset value 38 is applied to an adder 22 and the gain value 36 to a multiplier 20. A multiply and an add operation are performed on the input data signal 30 or 40 to create a corrected data signal 34. Since multiply and add operations 20 and 22 implement a linear transformation of the input signal, the order of operations 20, 22 may be reversed without affecting the transformation result.

The corrected signal 34 is then applied to an OLED display 24 to drive the OLED display with improved uniformity. Note that the common linear space conversion 28, while providing an input signal conversion to linear space, will not correct pixel uniformity. Hence, an individual linear transformation 20, 22 for each pixel is still required. The corrected data signal 34 may be converted to an analog signal, if desired. A further transformation of the corrected signal to a display space may be provided to optimize the response of the display (not shown). Hence, according to the present invention a linear conversion of the signal space followed by a linear transformation to correct the signal output provides an improved correction method employing less memory and providing improved accuracy over prior art methods employing look-up tables alone or in combination with linear interpolations between selected values stored in look-up tables.

In an alternative embodiment, the maximum input signal value at which the light-emitting element will not emit more than a predefined minimum brightness is stored as a difference from a mean value and/or the rate at which the brightness of the light-emitting element increases above the predefined minimum brightness in response to increases in the value of the input signal is stored as a difference from a mean value. This may reduce the storage requirements of the correction values. The mean values may be stored in a controller, at another location in the memory, or in a driver circuit. In yet another embodiment, an indicator bit may be employed with the correction signals for each pixel to indicate when a correction is out of range. Out-of-range pixel corrections may be stored elsewhere in the memory, controller, or driving circuit.

In one embodiment, the memory for the look-up table 28 is packaged with an associated display device, to enable efficient packaging, shipment, and interconnection. Such a package can include a memory affixed to the display or to a connector fastened to the display and possibly sharing some of the connections of the connector.

According to a further embodiment of the present invention, the OLED display 24 may be a color display with color pixels comprising, for example, red, green, and blue sub-pixels. For such a color display, a set of offset and gain values may be calculated for each sub-pixel, stored in a memory, and employed to correct an input signal, as described above. In order to minimize cost and size, a single integrated circuit memory having 32 bits (four bytes) of storage at each address location may be employed to provide 32 bits of correction information for each pixel. This storage may be divided in a variety of ways between the offset and gain values for each sub-pixel. For example, four bits may be employed for storing each of the red and blue offset values, six bits may be employed for storing each of the red and blue gain values, five bits may be employed for storing the green offset value and 7 bits for the green gain value. Since the human eye is most sensitive to green, additional information may be provided for the green channel. Alternatively, ten bits (four for offset and six for gain) may be provided for every color channel and the remaining two bits employed for other information. In a four-color pixel system (e.g. red, green, blue, and white), eight bits may be employed for each sub-pixel, for example with three bits of offset information and five bits of gain information. Alternatively, a larger memory having eight bits for each offset and gain value (6 bytes per pixel location) may be employed. In comparison with the prior art, this embodiment of the present invention may employ a lookup table of only 60,000 bytes for a 100-by-100-element display. A variety of memories having different numbers of bits per memory address are available commercially. In particular, memories with 8 bits or 32 bits per address location are known. In a further embodiment of the present invention, the corrections for each light-emitting element of a color in a color display may be adjusted to control the white point of the display.

In a typical flat-panel display, and in particular for OLED displays, thin-film transistors are used to drive the pixels. The thin-film transistors often have variable performance, for example, the voltage at which they turn on may vary from transistor to transistor. Hence, the uniformity of the pixels in the display will be compromised and a variety of different control signals needed to turn all of the pixels on at a common brightness. Moreover, the manufacturing process for the pixel elements may cause one pixel to have a different efficiency from another. Hence, the response to increasing signal values will not result in a comparable increase in pixel brightness for all pixels and the display will not be uniform. In particular, OLED devices are subject to manufacturing variability depending on the process for organic material vaporization and deposition on the display. This variability can affect the efficiency of pixels in the display.

Figure 4A:
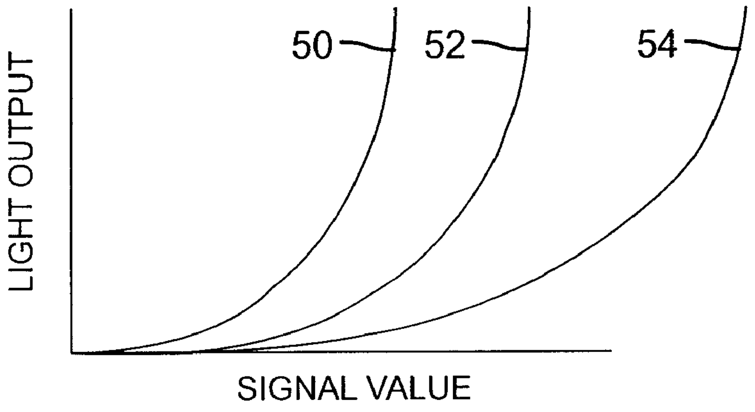
FIGS. 4*a*–4*f* are graphs illustrating relationship between signal values and light output.

Referring to FIG. 4*a*, the light emitted in response to a variety of signal values for three pixels is illustrated. The first pixel begins emitting light at a first signal value and responds to an increasing signal value at a first rate as illustrated in the first signal value to light output curve 50. Similarly, the second pixel begins emitting light at a second, different signal value and responds to an increasing signal value at a different rate as illustrated in the second signal value to light output curve 52. Likewise, the third pixel begins emitting light at a third, different signal value and responds to an increasing signal value at a different rate as illustrated in the second signal value to light output curve 54. As illustrated here, the value at which each of the three pixels begin emitting light is different, as is the rate at which their light output increases in response to increasing signal values.

Figure 4B:
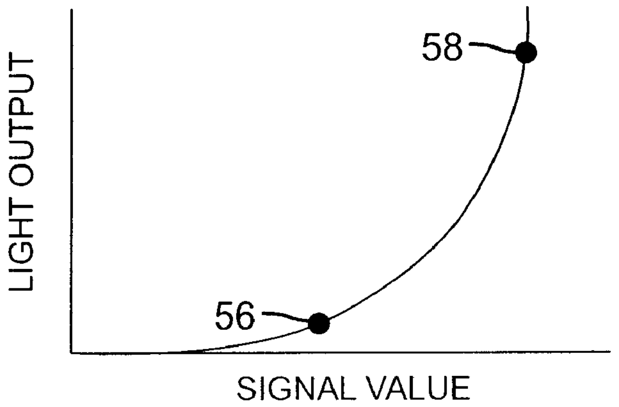
Figure 4C:
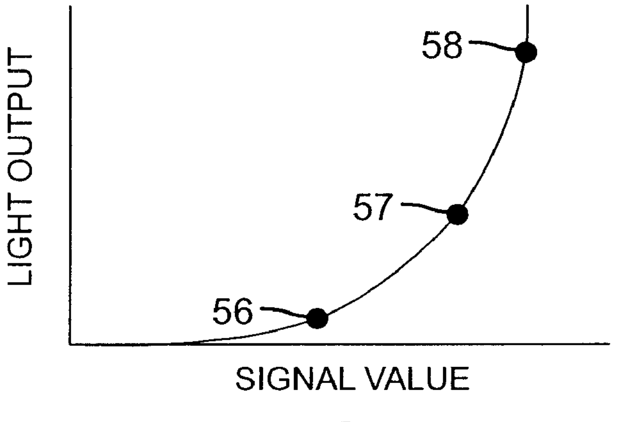

According to the present invention, the brightness of the light-emitting elements is measured at two or more different data input signal values. Referring to FIG. 4*b*, the dots represent two light output measurements 56 and 58 at two different data input signal values. Referring to FIG. 4*c*, more than two measurements may be taken at more than two data input signal values and the results averaged to form a more accurate estimate of performance. In accordance with the invention, however, measurements need not be made for every possible input signal value.

Figure 6:
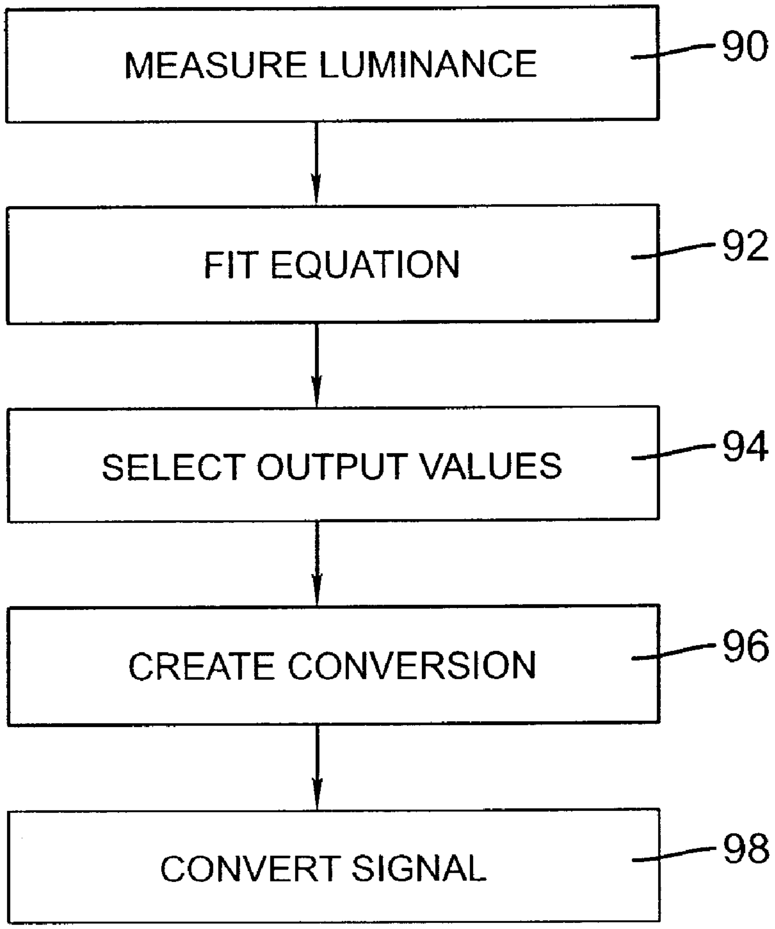
FIG. 6 is a flow diagram according to an embodiment of the present invention.

According to an alternative embodiment of the present invention, the correction of the input data signal may be enhanced by first converting the input signal to a linear space in which the light output is linearly related to an increase in data input signal value, if it is not already in such a space. This conversion may be common to all light emitting elements, common to all light emitting elements of a common color, or individualized for each light-emitting element. Such conversions may be complex, since the relationship between signal value and brightness may be likewise complex, especially for a defective light-emitting element. Referring to FIG. 4*c*, e.g., rather than averaging the values to form a poor linear approximation of the performance of the light emitters, the three values can be fit to an equation that is then used to create a conversion to linearize the relationship between signal value and light output. The conversion can be done either with a computing circuit or a lookup table. The curve may not be monotonic and may have a complex shape, since the light emitter itself may be dysfunctional. Hence, a conversion of the input signal may be necessary to enable good results. The measurements shown in FIG. 4*c* according to this alternative embodiment may be the average output from all light emitting elements, the average output from all light-emitting elements of a common color, or the light output from each light emitting element. Referring to FIG. 6, this conversion may be accomplished by first measuring 90 the brightness of the light-emitting elements at three or more input signal values; fitting 92 an equation to match the measured brightness values; selecting 94 a desired maximum brightness level at a desired input signal value; and creating 96 an input signal conversion employing the equation and the desired maximum brightness level at a desired input signal value to convert the input signal to a converted input signal having a linear relationship between input signal value and brightness and a maximum brightness level at the desired input signal value to provide a converted 98 input signal.

If the OLED display is a color display comprising light-emitting elements of multiple colors, separate conversions may be made for input signals for each color of light-emitting element thereby enabling independent corrections for each of the color planes in the OLED display.

It is generally desirable to drive a display employing a range of input signal values from a minimum brightness to a maximum brightness for an application. For example, in a digital camera display, a brightness range from 0 cd/m$^2$ to 200 cd/m$^2$ may be desired. It is also desirable to provide a smooth gray scale between the minimum and maximum brightness values. This may be achieved by mapping the input signal from its minimum value (typically zero) to its maximum value (typically 255 for an 8-bit system). Hence, the predefined minimum brightness will preferably be defined to be zero cd/m$^2$. The desired input signal corresponding to the minimum brightness is likewise preferably zero. However, because of non-uniformities in output, a light emitting element may emit no light for input signal values greater than zero, hence to provide a smooth gray scale between the minimum and maximum brightness values, the maximum input signal value at which the light-emitting element will not emit any light must be estimated and mapped to the minimum input signal value desired (typically zero).

Once the input signal values are converted into a linear space, the offset and gain values can be employed to cause each pixel in a display to output the same amount of light by correcting the signal used to drive the display to provide a known output. For example, if it is desired to uniformly emit light over a range of brightnesses from 0 $cd/m^2$ to 200 $cd/m^2$ employing a signal from 0 to 255 (8 bits), and a pixel has an offset of 10 and a gain of 0.7 cd/bit, the signal must be multiplied by 1.12 and offset by 10 to provide the desired output. Of course, a limited number of bits in the offset and gain values and the circuitry will limit the precision and accuracy of the result. Generally, the more bits available, the more accurate will be the result.

Figure 4D:
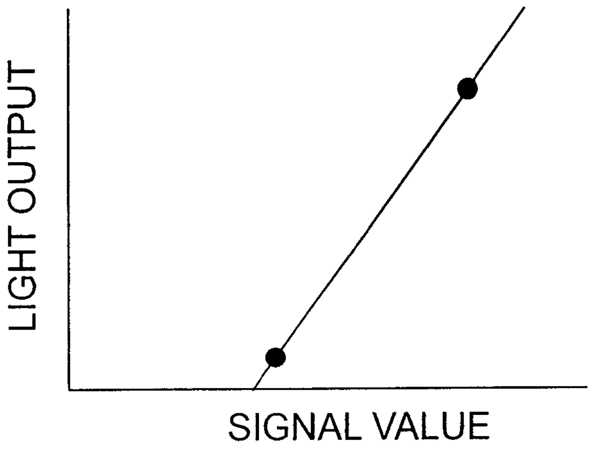
Figure 4E:
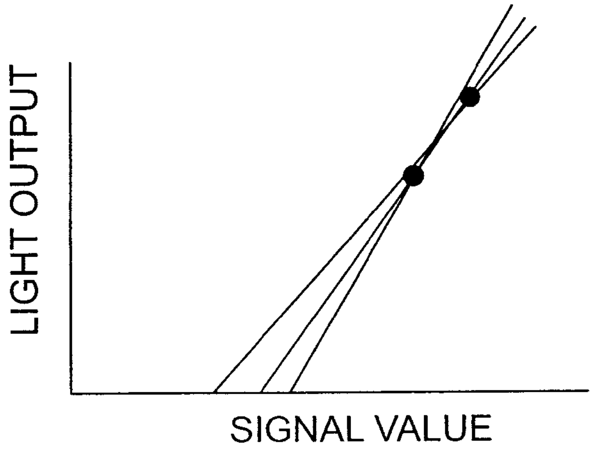

In the case of using only two brightness measurements, the gain value may be simply estimated by finding the slope of the line formed by the two brightness measurements. The offset value may be estimated by finding the input signal value at which the brightness equals zero (i.e., where the line crosses the input signal value axis). It is preferred to make the measurements of brightness at well-separated data input signal values. Since any measurement has an inherent error, the estimation of the gain and offset values may be more accurate if the values are not close together. Referring to FIG. 4*e* in comparison to FIG. 4*d*, the dot represents the range of error possible. As can be seen by the variety of lines drawn through the dots where they are close together, a wider variety of offset and gain values may be obtained and reduced accuracy may result. Multiple measurements may be made to improve accuracy (as shown in FIG. 4*c*) by providing more data points to fit a line. A variety of algorithms for fitting data may be employed as known in the numerical analysis art.

Widely separated brightness measurements may be taken in an automated fashion by employing a measurement device for measuring the brightness of the OLED device in response to the multi-valued input signal and including the steps of selecting the two or more different input signal values by driving at least one light emitting element at a first input signal value and then increasing or decreasing the input signal value until the measured brightness reaches a maximum or minimum measured value, and employing the input signal value corresponding to the maximum or minimum measured value as the larger or smaller of the two-or-more different input signal values.

Figure 7:
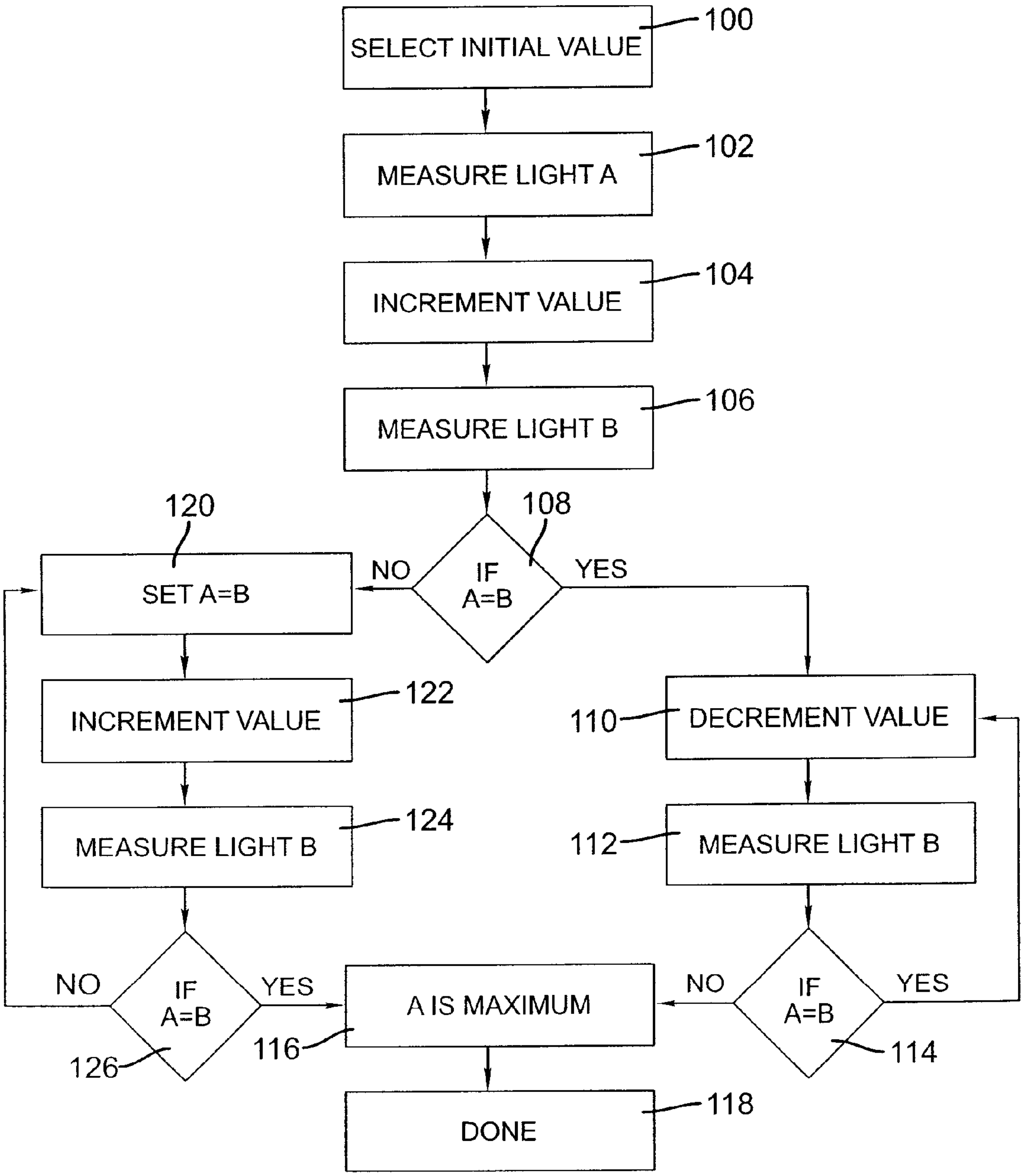
FIG. 7 is a flow diagram according to an embodiment of the present invention.

To determine widely separated brightness values, a process such as that shown in FIG. 7 may be employed to find suitable input signal values. Referring to FIG. 7, a maximum brightness value may be obtained by first selecting 100 an arbitrary input signal value. The light output A corresponding to the arbitrary input signal is then measured 102. The input signal value is then incremented 104 and the light output B corresponding to the incremented input signal measured 106. A and B are compared 108, and if equal either the output device has reached its maximum or the measurement device is saturated. In this case, the input signal value is decremented 110 and the light output B measured 112 and compared with A again 114. If the values of A and B are still equal, the system is still saturated and the process continues until a difference is found. When the measured light output changes 116, the input signal value corresponding to the previous measurement of B represents the minimum input signal value that will generate the maximum light output. If, in the initial comparison 108 of the values of A and B, the values are different, the maximum brightness is not necessarily reached and the value of A is set equal 120 to B, the input signal value is incremented 122 again, the output measured 124 and assigned to B, and the values of A and B are compared again. If the values are the same 116, the input signal value corresponding to A represents the minimum input signal value that will generate the maximum light output and the process is complete 118. If the values are not the same, the value of A is set equal 120 to B again, and the process repeats. The process of finding a minimum brightness value is similar to the process illustrated in FIG. 7, except that rather than incrementing, the input signal value is decremented, and vice versa. The processes may be employed for individual light emitting elements, or may be employed for all elements in a device together.

If the OLED display is a color display comprising light-emitting elements of multiple colors the process described in FIG. 7 may be repeated for each of the colors and separate two-or-more different input signal values may be selected for each color of light-emitting element.

Applicants have determined through experimentation that, despite measures taken to reduce the noise in the light output measurements, it can be difficult to consistently and accurately measure the light output from each of the light-emitting elements. In this case, it is possible to perform a global correction representing the average offset and gain of the device by measuring the output of all, or at least more than one, of the light-emitting elements. This can be done by measuring the overall brightness and gain of the OLED display at one or more input signal values and adjusting the correction based on the measured overall brightness and gain. The correction is preferably done after the individual light-emitting elements have been corrected and the measurement made with as many of the light-emitting elements illuminated as possible. After measuring the offset and gain of the device as a whole, a global correction can be incorporated into each of the individual corrections of the light-emitting elements.

The measurements may be made by employing an optical measurement device (for example a digital camera) for measuring the brightness of the OLED device in response to the multi-valued input signal. Applicants have determined that noise in the measurements (in particular sampling errors) may be reduced by including one or more of the steps of measuring the brightness of one or more light-emitting elements of the OLED device with the optical measurement device focused on the OLED device, and measuring the brightness of one or more light-emitting elements of the OLED device with the optical measurement device defocused on the OLED device. The separate measurements may be separately analyzed and their results combined to create a preferred global correction. Alternatively, the focused and defocused measurements may be combined before they are analyzed. If a digital camera is employed to make the measurements, the resulting images represent the output of the OLED light-emitting elements. These images may be processed using digital image processing means known in the art, for example averaging pixel values, identifying regions-of-interest around pixels, and determining characteristics of the regions such as centroids.

Figure 4F:
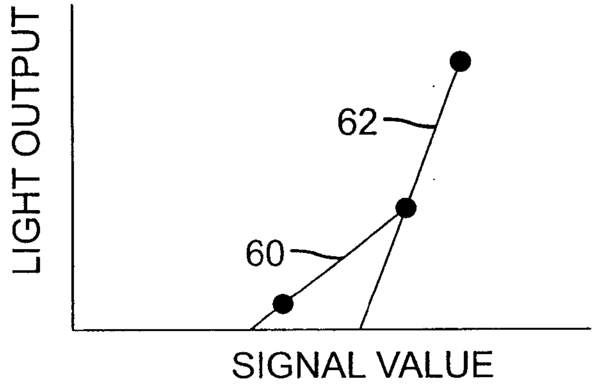

Even when employing a linear conversion, the brightness of an OLED light-emitting element may not always be perfectly linearly related to the input signal values supplied to the display. Although the driving circuits used in such displays provide a functional transform in the relationship between the input signal values and the associated light-emitting element brightness, the desired correction factors for a light-emitting element may vary in non-linear ways at different brightness levels. Experiments performed by applicant have taught this is especially true for non-uniform light-emitting elements that, by definition, do not behave as desired or expected. In that case, if a linearizing conversion is not readily available, or is too costly or inaccurate, offsets and gains corresponding to a plurality of linear line segments may be employed to more closely approximate the actual performance of the light-emitting element. Referring to FIG. 4*f*, e.g., two line segments 60 and 62 are formed from three data points. Each consecutive pair of points may be used to calculate a different gain and offset value. These gain and offset values may be stored in the memory as described above. However, since they are range dependent (the appropriate offset and gain values depend on the data signal value) at least a portion of the input data signal must also be applied to the memory, as shown with the dotted line 30*a* in FIG. 2. Applicants have determined that, even in the worst cases, only a few different sets of correction values need be employed to provide adequate accuracy, hence only the most significant bits of a digital input data signal typically would need to be applied to the memory 26. For example, four different correction values may be employed over an 8-bit range: a first gain and offset value for the signal values ranging from 0–63, a second gain and offset value for the signal values ranging from 64–127, a third gain and offset value for the signal values ranging from 128–191, and a fourth gain and offset value for the signal values ranging from 192–255. In this example, only the two most significant bits are applied to the memory 26 and an increase in memory size of a factor of four is required to store the additional information.

In an alternative embodiment of the present invention, a simplified correction mechanism may be employed to further reduce the complexity and size of the correction hardware. Applicant has determined that a large number of significant non-uniformity problems are associated with rows and columns of light-emitting elements. This is attributable to the manufacturing process. Therefore, it is possible to reduce the memory size by grouping pixels and using common correction factors for each group. For example, since pixel addressing schemes typically uses an x,y address, rather than supplying an individual correction factor for every light-emitting element, correction factors for rows or columns might be employed. If all of the pixels in one dimension (for example, a row) have common correction factors a single set of correction factors may be employed for the entire group (for example, a row). In the limit, a single set of values may be employed for all of the pixels in the display. In these situations, the address range is much smaller and the memory needed is correspondingly decreased.

Computing circuitry for integer multiplications and additions using fractions are readily accomplished using conventional digital circuitry known in the art. Likewise analog solutions, for example employing operational amplifiers, are known in the art. Algebraic computations for lines are well known and employ, for example, equations of the form $y=mx+b$, where m represents the slope of the equation and the gain in the system and $-b/m$ the offset. The conversion may be accomplished by multiplying the input signal value by the reciprocal of the slope ($1/m$) and adding the offset ($-b/m$).

Figure 5:
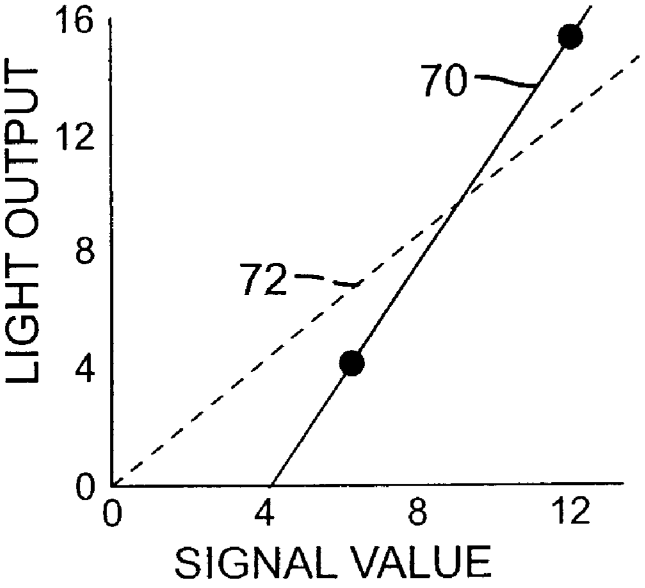
FIG. 5 is a graph illustrating relationship between signal values and light output.

For example, referring to FIG. 5, a light emitting element may output 4 cd/m$^2$ when driven at a signal value of 6 and may output 16 cd/m$^2$ when driven with a signal value of 12. In this example, the performance of the light emitting element in a linear space may be characterized as $L=2*V-8$, $L, V>=0$, where L is the light output in cd/m$^2$ and V is the value of the driving signal. The performance is illustrated with line segment 70 in FIG. 5. The gain is then 2 and the offset is 4. If the desired output is as shown with line segment 72 in FIG. 5, then the correction circuitry converts the actual output (70) to the desired output (72). That is, the desired output function (72) must be mapped onto the actual output function (70). As noted above, this conversion is accomplished by multiplying the input signal value by the reciprocal of the slope (in this example 0.5) and adding the offset (in this example 4) to determine a corrected signal value that will create the desired output, that is: corrected signal value=(input signal value)/gain+offset (in this example corrected signal value=(input signal value)/2+4).

Other functions can be mapped similarly. If the offset value is negative (that is the output of a light emitting element cannot be turned off), an offset of zero may be employed for the defective light-emitting element. Alternatively, it may be desirable to map all light emitting elements to match the performance of the defective light emitting elements. The multiplication value may be either greater or less than one. If a multi-segment correction is employed (as illustrated in FIG. 4*f*), the gain and offset for each segment should be calculated and employed for input signals in the range corresponding to the segment.

Means to measure the brightness of each light-emitting element in a display are known and described, for example, in the references provided above. In a particular embodiment, systems and methods as described in copending, commonly assigned U.S. Ser. No. 10/858,260, filed Jun. 1, 2004, may be employed, the disclosure of which is incorporated by reference herein.

In typical applications, displays are sorted after manufacture, into groups that may be applied to different purposes. Some applications require displays having no, or only a few, faulty light-emitting elements. Others can tolerate variability but only within a range, while others may have different lifetime requirements. The present invention provides a means to customize the performance of an OLED display to the application for which it is intended. It is well known that OLED devices rely upon the current passing through them to produce light. As the current passes through the materials, the materials age and become less efficient. By applying a correction factor to a light-emitting element to increase its brightness, a greater current is passed through the light-emitting element, thereby reducing the lifetime of the light-emitting element while improving the uniformity.

The correction factors applied to an OLED device may be related to the expected lifetime of the materials and the lifetime requirements of the application for which the display is intended. The maximum combined correction factor may be set, e.g., so as to not exceed the ratio of the expected lifetime of the display materials to the expected lifetime of the display in the intended application. For example, if a display has an expected lifetime of 10 years at a desired brightness level, and an application of that display has a requirement of 5 years, the maximum combined correction factor for that display may be set so as not to exceed two, if the current-to-lifetime relationship is linear. If the relationship is not linear, a transformation to relate the lifetime and current density may be employed. These relationships can be obtained empirically. Hence, the combined correction factor for a display may be limited by application. Alternatively, one can view this relationship as a way to improve the yields in a manufacturing process by enabling uniformity correction in a display application (up to a limit) so that displays that might have been discarded, may now be used. Moreover, OLED devices having more-efficient light-emitting elements may have a reduced power requirement thereby enabling applications with more stringent power requirements.

The display requirements may be further employed to improve manufacturing yields by correcting the uniformity of specific light-emitting elements or only partially correcting the uniformity of the light-emitting elements. Some applications can tolerate a number of non-uniform light-emitting elements. These light-emitting elements may be chosen to be more or less noticeable to a user depending on the application and may remain uncorrected, or only partially corrected, thereby allowing the maximum combined correction factor to remain under the limit described above. For example, if a certain number of bad light-emitting elements were acceptable, the remainder may be corrected as described in the present invention and the display made acceptable. In a less extreme case, bad light-emitting elements may be partially corrected so as to meet the lifetime requirement of the display application and partially correcting the uniformity of the display. Hence, the correction factors may be chosen to exclude light-emitting elements, or only partially correct light-emitting elements, that fall outside of a correctable range. This range, as observed above, may be application dependent.

There are a variety of ways in which light-emitting elements may be excluded from correction. For example, a minimum or maximum threshold may be provided outside of which no light-emitting elements are to be corrected. The threshold may be set by comparing the expected lifetime of the materials and the application requirements.

In a preferred embodiment, the present invention is employed in a flat-panel OLED device composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light-emitting displays can be used to fabricate such a device, including both active- and passive-matrix OLED displays having either a top- or bottom-emitter architecture.

The invention has been described in detail with particular reference to certain preferred embodiments thereof, but it will be understood that variations and modifications can be effected within the spirit and scope of the invention.

PARTS LIST

8 Provide display step
10 measure brightness step
11 convert signal step
12 estimate parameters step
14 convert signal step
16 correct signal step
18 output corrected signal step
20 multiplier
22 adder
24 display
26 memory
**26*a*** first portion of memory
**26*b*** second portion of memory
28 conversion lookup table
30 data input signal
**30*a*** portion of data input signal
32 address signal
34 corrected data input signal
36 gain correction signal
38 offset correction signal
40 converted data signal
50 first signal value to light output curve
52 second signal value to light output curve
54 third signal value to light output curve
56 first measurement value
57 third measurement value
58 second measurement value
60 first line segment
62 second line segment
70 actual signal response
72 desired signal response
80 lookup table
90 measure luminance step
92 fit equation step
94 select output values step
96 create conversion step
98 convert signal step
100 select initial value step
102 measure light step
104 increment value step
106 measure light step
108 compare measurements step
110 decrement value step
112 measure light step
114 compare measurements step
116 determine maximum step
118 task complete step
120 assign measurement value step
122 increment value step
124 measure light step
126 compare measurements step

The invention claimed is:

1. A method for the correction of average brightness or brightness uniformity variations in OLED displays, comprising:

a) providing an OLED display having one or more light-emitting elements responsive to a multi-valued input signal for causing the light-emitting elements to emit light at a plurality of brightness levels;

b) measuring the brightness of each light-emitting element at two or more, but fewer than all possible, different input signal values;

c) employing the measured brightness values to estimate a maximum input signal value at which the light-emitting element will not emit more than a predefined minimum brightness and the rate at which the brightness of the light-emitting element increases above the predefined minimum brightness in response to increases in the value of the input signal; and d) using the estimated maximum input signal value at which the light-emitting element will not emit light more than the predefined minimum brightness and the rate at which the brightness of the light-emitting element increases above the predefined minimum brightness in response to increases in the value of the input signal to modify the input signal to a corrected input signal to correct the light output of the light-emitting elements.

2. The method of claim 1, wherein the predefined minimum brightness is zero.

3. The method of claim 1, wherein the modification of the input signal to a corrected input signal comprises a linear transformation.

4. The method of claim 3, wherein the modification of the input signal to a corrected input signal is performed with an adder and/or a multiplier.

5. The method of claim 1, wherein the OLED display has more than one light-emitting element and the corrected input signal improves the brightness uniformity of the OLED display.

6. The method of claim 1, wherein the OLED display is a color display comprising light-emitting elements of multiple colors.

7. The method of claim 6, wherein the white point of the display is adjusted by adjusting the input signal modifications for each light-emitting element to modify the average brightness of the display for each color of light.

8. The method of claim 1, wherein the input signal modifications for each light-emitting element are adjusted to modify the average brightness of the display.

9. The method of claim 1, wherein maximum input signal values at which the light-emitting elements will not emit light above the predefined minimum brightness and rates at which the brightness of the light-emitting elements increase above the predefined minimum brightness in response to increases in the value of the input signal that have been estimated based on the brightness values of light-emitting elements measured at only two different input signal values are employed to modify the input signal to a corrected input signal for the entire range of the multi-valued input signal to correct the light output of the light-emitting elements.

10. The method of claim 1, wherein the brightness of each light-emitting element is measured at more than two different input signal values and the measurements are combined to estimate the maximum input signal value at which the light-emitting element does not emit light above the predefined minimum brightness and the rate at which the brightness of the light-emitting element increases above the predefined minimum brightness in response to increases in the value of the input signal.

11. The method of claim 1, wherein the brightness of each light-emitting element is measured at more than two different input signal values and each consecutive pair of measurements are combined to estimate the maximum input signal value at which the light-emitting element does not emit light above a predefined minimum brightness and the rate at which the brightness of the light-emitting element increases above a predefined minimum brightness in response to increases in the value of the input signal for each pair, and the estimated values are applied for modification of input signals in each measurement range.

12. The method of claim 1, wherein the estimated maximum input signal value at which the light-emitting element will not emit light above a predefined minimum brightness and the rate at which the brightness of the light-emitting element increases above a predefined minimum brightness in response to increases in the value of the input signal for each light-emitting element are stored as correction values within a lookup table.

13. The method of claim 12, wherein the correction values for each light-emitting element are stored together at single address locations of the lookup table.

14. The method of claim 1, wherein the input and corrected input signals are digital signals.

15. The method of claim 14, wherein the corrected input signal has more bits than the input signal.

16. The method of claim 14 wherein the maximum input signal value at which the light-emitting element will not emit more than a predefined minimum brightness is stored with a first number of bits and the rate at which the brightness of the light-emitting element increases above the predefined minimum brightness in response to increases in the value of the input signal is stored at a second number of bits, and wherein the first and second number of bits are different.

17. The method of claim 1 wherein the maximum input signal value at which the light-emitting element will not emit more than a predefined minimum brightness is stored as a difference from a mean value and/or the rate at which the brightness of the light-emitting element increases above the predefined minimum brightness in response to increases in the value of the input signal is stored as a difference from a mean value.

18. The method of claim 1, wherein either or both of the input and corrected input signals are analog signals.

19. The method of claim 1, further comprising a conversion to convert the measurements and/or input signals into a linear space before the estimations and/or modifications are performed.

20. The method of claim 19, wherein a common conversion into a linear space is performed for all light emitting elements.

21. The method of claim 20, further comprising the steps of calculating the conversion by:

a) measuring the brightness of the light-emitting elements at three or more input signal values;

b) fitting an equation to match the measured brightness values;

c) selecting a desired maximum brightness level at a desired input signal value; and d) creating an input signal conversion employing the equation and the desired maximum brightness level at a desired input signal value to convert the input signal to a converted input signal having a linear relationship between input signal value and brightness and a maximum brightness level at the desired input signal value.

22. The method of claim 21, wherein the brightness values measured for calculating the conversion are average brightness values of the light emitting elements.

23. The method of claim 19, wherein the OLED display is a color display comprising light-emitting elements of multiple colors and separate common conversions are made for input signals for each color of light-emitting element.

24. The method of claim 1, further comprising selecting the two or more different input signal values by driving at least one light emitting element at a first input signal value and then increasing or decreasing the input signal value until the measured brightness reaches a maximum or minimum measured value, and employing the input signal value corresponding to the maximum or minimum measured value as the larger or smaller of the two-or-more different input signal values.

25. The method of claim 24, wherein the OLED display is a color display comprising light-emitting elements of multiple colors and independently selecting two-or-more different input signal values for each color of light-emitting element.

* * * * *